US 8,185,893 B2

(12) United States Patent
Hyser et al.

(10) Patent No.: US 8,185,893 B2
(45) Date of Patent: May 22, 2012

(54) STARTING UP AT LEAST ONE VIRTUAL MACHINE IN A PHYSICAL MACHINE BY A LOAD BALANCER (75) Inventors: Chris D. Hyser, Victor, NY (US); Bret A. McKee, Ft. Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1608 days.

(21) Appl. No.: 11/588,635

(22) Filed: Oct. 27, 2006

(65) Prior Publication Data

US 2008/0104608 A1    May 1, 2008

(51) Int. Cl.
G06F 9/455    (2006.01)
G06F 9/46     (2006.01)

(52) U.S. Cl. ............................................ 718/1; 718/106
(58) Field of Classification Search ............... 718/1, 106
See application file for complete search history.

(56) References Cited

U.S. PATENT DOCUMENTS

| 5,745,735 | A | 4/1998 | Cohn |
| 5,802,062 | A | 9/1998 | Gehani |
| 6,321,337 | B1 | 11/2001 | Reshef |
| 6,421,739 | B1 | 7/2002 | Holiday |
| 6,732,139 | B1 * | 5/2004 | Dillenberger et al. ........ 718/102 |
| 6,901,522 | B2 | 5/2005 | Buch |
| 6,934,952 | B2 | 8/2005 | Sarkar |
| 6,944,699 | B1 | 9/2005 | Bugnion et al. |
| 6,970,902 | B1 | 11/2005 | Moon |
| 6,985,951 | B2 | 1/2006 | Kubala |
| 7,089,558 | B2 | 8/2006 | Baskey |
| 7,127,625 | B2 | 10/2006 | Farkas |
| 7,174,381 | B2 | 2/2007 | Gulko |
| 7,203,944 | B1 | 4/2007 | van Rietschote |
| 7,480,908 | B1 | 1/2009 | Tene |
| 7,519,964 | B1 | 4/2009 | Islam |
| 7,577,959 | B2 * | 8/2009 | Nguyen et al. ................. 718/105 |
| 7,739,527 | B2 * | 6/2010 | Rothman et al. ............... 713/320 |
| 2001/0034752 | A1 | 10/2001 | Kremien |
| 2002/0087611 | A1 * | 7/2002 | Tanaka et al. ...................... 709/1 |
| 2002/0194389 | A1 | 12/2002 | Worley, Jr. et al. |
| 2003/0037092 | A1 | 2/2003 | McCarthy |
| 2004/0010787 | A1 | 1/2004 | Traut |
| 2004/0117539 | A1 | 6/2004 | Bennett |
| 2004/0128670 | A1 * | 7/2004 | Robinson et al. ................. 718/1 |
| 2004/0186920 | A1 | 9/2004 | Birdwell |
| 2004/0193476 | A1 | 9/2004 | Aerdts |
| 2005/0039180 | A1 | 2/2005 | Fultheim |
| 2005/0060590 | A1 | 3/2005 | Bradley |
| 2005/0149940 | A1 | 7/2005 | Calinescu |
| 2005/0166074 | A1 | 7/2005 | Hack |

(Continued)

OTHER PUBLICATIONS

MVware Technology Network, "VMware VirtualCenter 1.2 Support Documentation," 16 pages (at least as early as Oct. 25, 2006).

(Continued)

*Primary Examiner* — Jennifer To
*Assistant Examiner* — Blake Kumabe (57) ABSTRACT

A system has plural physical machines that contain virtual machines. A load balancer receives a request from a client. In response to the request, it is determined whether at least one additional virtual machine should be started up. In response to determining that at least one additional virtual machine should be started up, the load balancer sends at least one command to start up the at least one additional virtual machine in at least one of the physical machines.

18 Claims, 3 Drawing Sheets

U.S. PATENT DOCUMENTS

| | | |
|---|---|---|
| 2005/0166075 A1 | 7/2005 | Hack |
| 2005/0246505 A1 | 11/2005 | McKenney et al. |
| 2005/0278722 A1 | 12/2005 | Armstrong et al. |
| 2006/0023884 A1 | 2/2006 | McKee |
| 2006/0041733 A1 | 2/2006 | Hyser |
| 2006/0075067 A1 | 4/2006 | Blackmore |
| 2006/0136913 A1 | 6/2006 | Sameske |
| 2006/0149906 A1 | 7/2006 | Misra |
| 2006/0195715 A1 | 8/2006 | Herington |
| 2006/0200819 A1 | 9/2006 | Cherkasova et al. |
| 2006/0200820 A1 | 9/2006 | Cherkasova et al. |
| 2006/0200821 A1 | 9/2006 | Cherkasova et al. |
| 2006/0230407 A1* | 10/2006 | Rosu et al. .................... 718/105 |
| 2007/0043860 A1 | 2/2007 | Pabari |
| 2007/0067435 A1 | 3/2007 | Landis |
| 2007/0079307 A1 | 4/2007 | Dhawan |
| 2007/0083642 A1 | 4/2007 | Diedrich |
| 2007/0124474 A1 | 5/2007 | Margulis |
| 2007/0171921 A1 | 7/2007 | Wookey |
| 2007/0180280 A1 | 8/2007 | Bolan |
| 2007/0180448 A1 | 8/2007 | Low |
| 2007/0180450 A1 | 8/2007 | Croft |
| 2007/0186212 A1 | 8/2007 | Mazzaferri |
| 2007/0220121 A1* | 9/2007 | Suwarna ...................... 709/220 |
| 2008/0046890 A1* | 2/2008 | Dunlap et al. ................ 718/104 |

OTHER PUBLICATIONS

Wikipedia definition of "Virtual machine," pp. 1-6 (at least as early as Sep. 6, 2006).

TheFreeDictionary definition of "Virtual Machine," pp. 1-3 (at least as early as Sep. 6, 2006).

Wikipedia definition for "Hypervisor," pp. 1-2 (at least as early as Sep. 6, 2006).

Megow et al., "Stochastic Online Scheduling on Parallel Machines," Springer-Verlag Berlin Heidelberg, pp. 167-180, 2005.

Hou et al., "A Genetic Algorithm for Multiprocessor Scheduling," IEEE Transactions on Parallel and Distributed Systems, vol. 5, No. 2, Feb. 1994.

YarKhan et al., "Experiments with Scheduling Using Simulated Annealing in a Grid Environment," Springer-Verlag Berlin Heidelberg, pp. 232-242, 2002.

U.S. Appl. No. 11/588,691, Non-Final Rejection dated Oct. 14, 2010, pp. 1-15 and attachments.

U.S. Appl. No. 11/588,691, Final Rejection dated Mar. 31, 2011, pp. 1-18 and attachments.

Hyser et al, U.S. Appl. No. 12/240,694 entitled "Migrating a Virtual Machine Based on Information Relating to Communications Among Virtual Machines" filed Sep. 29, 2008 (22 pages).

Hyser et al., U.S. Appl. No. 12/240,611 entitled "Migration of a Virtual Machine in Response to Regional Environment Effects" filed Sep. 29, 2008 (27 pages).

Hyser et al., U.S. Appl. No. 11/588,607 entitled "Migrating Virtual Machines Between Physical Machines in a Defined Group" filed Oct. 27, 2006 (28 pages).

Hyser et al., U.S. Appl. No. 11/588,683 entitled "Retrieving Data of a Virtual Machine Based on Demand to Migrate the Virtual Machine Between Physical Machines" filed Oct. 27, 2006 (26 pages).

Hyser et al.., U.S. Appl. No. 11/588,691 entitled "Selecting One of Plural Layouts of Virtual Machines on Physical Machines" filed Oct. 27, 2006 (29 pages).

\* cited by examiner

STARTING UP AT LEAST ONE VIRTUAL MACHINE IN A PHYSICAL MACHINE BY A LOAD BALANCER

BACKGROUND

Services can be provided by a distributed network of servers. In one example, the servers can be web servers that are accessed remotely by client stations, where the web servers provide various online services, including electronic commerce, search services, and so forth. Other examples of distributed arrangements of servers include a network of application servers, a network of storage servers, and others.

As requests are submitted to a network of servers, a concern is that some of the servers may become overloaded. To reduce the likelihood of overloading of servers, operators of the network of servers typically plan ahead for worst-case loading scenarios, which typically occur during working hours. Based on the expected worst-case scenario, the operator would plan for a sufficient number of servers to be provided. However, during periods of low use, many of the servers become idle, and may continue to consume some amount of power. Although idle servers consume a lower amount of power than an active server, it is noted that idle servers still consume some substantial amount of power. In a network of a large number of servers, the aggregated power consumption of idle servers may be significant.

SUMMARY

In general, according to some embodiments, a load balancer is able to start up additional virtual machines based on loading of active virtual machines in physical machines of a system. If active virtual machines are able to handle requests, the load balancer continues to distribute the requests to such active virtual machines. However, as the loading of the virtual machines becomes heavy, the load balancer may decide to start up virtual machines.

Other or alternative features will become apparent from the following description, from the drawings, and from the claims.

BRIEF DESCRIPTION OF THE DRAWINGS

Some embodiments of the invention are described with respect to the following figures.

DETAILED DESCRIPTION

Figure 1:
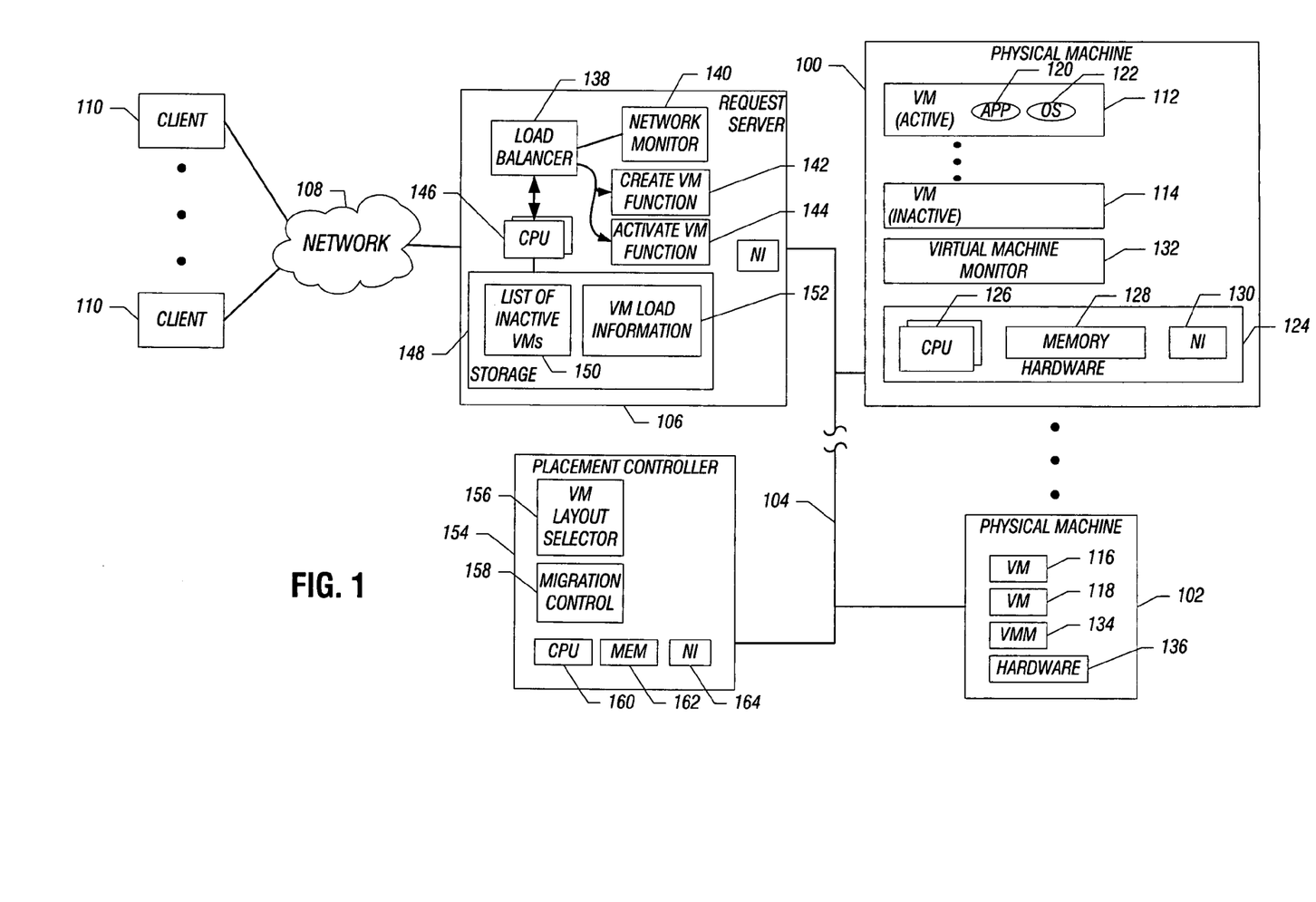
FIG. 1 is a block diagram of an arrangement that includes a load balancer for balancing load across multiple virtual machines provided in physical machines, where the load balancer is able to start up virtual machines based on loading of existing virtual machines, in accordance with an embodiment.

FIG. 1 illustrates an arrangement of physical machines 100, 102 that are connected over a network 104 to a request server 106 (which can be a computer). Although just two physical machines 100, 102 are depicted in FIG. 1, it is noted that a larger number of physical machines can be provided. The network 104 can be an internal network, such as a local area network (LAN), a wide area network (WAN), or some other type of network. Although reference is made to "network" in the discussion, it is noted that some embodiments can be used with other types of interconnects. The collection of physical machines 100, 102 and the request server 106 can be part of a web server farm, an application server farm, a storage server farm, a data center, a switch or router farm, or other server system. Examples of the physical machines include computers (e.g., application servers, storage servers, web servers, etc.), communications modules (e.g., switches, routers, etc.), and other types of machines. "Physical machine" indicates that the machine is an actual machine made up of software and hardware.

The request server 106 is coupled over a network 108 (e.g., the Internet) to client stations 110. The client stations 110 are able to submit requests over the network 108 to the request server 106, which request server 106 then submits the requests to one or more of the physical machines 100, 102. More specifically, the request server 106 submits the requests to one or more virtual machines (VMs) that are contained in the physical machines 100, 102.

As depicted in FIG. 1, virtual machine 112 and 114 are located in physical machine 100 and virtual machines 116 and 118 are located in physical machine 102. The number of virtual machines in each physical machine is provided for purposes of example, as a smaller number or larger number of virtual machines can be provided in each physical machine. Generally, each physical machine can include one or more virtual machines.

A "virtual machine" refers to some partition or segment (made up of software and/or hardware) of the physical machine that is provided to virtualize or emulate a physical machine. From the perspective of a user, a virtual machine behaves just like a physical machine. As depicted in FIG. 1, according to some embodiments, the virtual machine 112 includes one or more software applications 120 and an operating system 122 (with the operating system 122 including device drivers to allow the virtual machine 112 to interact with underlying hardware of the physical machine 100). The other virtual machine 114 can also include a software application and operating system.

It is noted that operating systems that are part of corresponding virtual machines within a physical machine can be different types of operating systems or different versions of an operating system. This allows software applications designed for different operating systems to execute on the same physical machine.

The virtual machines within a physical machine are designed to share the physical resources of the physical machine. In the physical machine 100, these physical machine resources include hardware 124, which includes one or more central processing unit (CPUs) 126, memory 128, a network interface 130, and other resources.

The physical machine 100 also includes a virtual machine monitor (VMM) 132, also called a hypervisor, which manages the sharing (by virtual machines 112, 114) of the physical resources, including the hardware 124, of the physical machine 100. The VMM 132 virtualizes the physical resources, including the hardware 124, of the physical machine 100. Also, the VMM 132 intercepts requests for resources from operating systems in the respective virtual machines 112, 114 so that proper allocation of the physical resources of the physical machine 100 can be performed. For example, the VMM 132 manages memory access, input/output (I/O) device access, and CPU scheduling for the virtual machines. Effectively, the VMM 132 provides an interface between the operating system of each virtual machine and the underlying hardware 124 of the physical machine. The interface provided by the VMM 132 to an operating system of a virtual machine is designed to emulate the interface provided by the actual hardware of the physical machine 100.

The physical machine 102 similarly includes a VMM 134 and hardware 136.

As depicted in FIG. 1, the virtual machine 112 is indicated as being an active virtual machine, whereas the virtual machine 114 is indicated as being an inactive virtual machine. An inactive virtual machine is a virtual machine that has been placed into a suspend state (which can be any one of various sleep, standby, hibernation states, or other lower power mode in which the virtual machine is not consuming any power or is consuming reduced power). An inactive virtual machine is contrasted with a virtual machine that is just merely idle. An idle virtual machine is still an active virtual machine, except that the idle virtual machine is not performing execution of any task. An idle virtual machine still consumes some amount of power.

In accordance with some embodiments, the request server 106 has a load balancer 138 (or multiple load balancers) that is (are) able to activate the inactive virtual machine 114 based on loading of the other virtual machines in the physical machines 100, 102. If the other virtual machines (112, 116, 118, which are all assumed to be active) are able to handle requests from clients 110, the load balancer 138 continues to distribute the requests to such virtual machines 112, 116, 118. However, as the loading of the virtual machines becomes heavy (based on monitoring by a network monitor 140 in the request server 106), the load balancer 138 may decide to activate the inactive virtual machine 114. Activating the virtual machine 114 refers to bringing the inactive virtual machine out of its suspend state and into an active state. Alternatively, instead of activating an inactive virtual machine, the load balancer 138 can create a new virtual machine in one of the physical machines 100, 102 if there are no inactive virtual machines that can be activated and the active virtual machines 112, 116, 118 are unable to handle new workload from clients 110. Creating a virtual machine can be performed by creating from a template or by cloning another virtual machine. Generally, the load balancer 138 is able to "start up" a virtual machine to handle requests from client stations 110 as virtual machine loading specifies that additional virtual machine capacity is desirable. Starting up a virtual machine refers to either activating an inactive virtual machine, or creating a new virtual machine. To create a new virtual machine, the load balancer 138 calls a create VM function 142 in the request server 106. On the other hand, to activate an inactive virtual machine, the load balancer calls an activate VM function 144 in the request server 106.

The load balancer 138 and network monitor 140 can be software modules that are executable on one or more CPUs 146 in the request server 106, which CPU(s) 146 is (are) connected to a storage 148. The storage 148 can maintain a list of inactive virtual machines 150 that are accessible by the load balancer 138 to determine which virtual machines are inactive and where such inactive virtual machines are located. The load balancer 138 can select one of the inactive virtual machines to activate when desired.

The storage 148 can also store virtual machine load information 152 that has been monitored by the network monitor 140. In one implementation, the network monitor 140 can receive periodic updates of the load condition of each virtual machine (e.g., how many tasks, zero or more, each virtual machine is executing, resources available to the virtual machine, etc.). The loading information 152 can be provided by the virtual machines periodically or in response to a change in the load condition of each virtual machine. Alternatively, instead of the virtual machines pushing load information to the network monitor 140, the network monitor 140 can perform polling of the virtual machines to determine their load conditions. It is also possible for the network monitor to deduce the loads by remembering the network traffic that it has directed there and knowing something about the processing requirements of the requests.

Another node on the network 104 is a placement controller 154 (or multiple placement controllers). The placement controller 154 provides automated management of the placement of virtual machines in corresponding physical machines. In the ensuing discussion, reference is made to just one placement controller 154 and one load balancer 138. Note, however, that the tasks of the placement controller and load balancer can be performed by multiple placement controllers and load balancers.

The placement controller 154 is able to determine an efficient placement of the virtual machines on corresponding physical machines based on predefined criteria (according to a policy set by an enterprise, a user, an administrator, etc.). The predefined criteria according to the policy can include a target quality-of-service level to be provided, loading criteria (which specify some target loading level on a physical resource or machine), balancing criteria (which specify that load on physical machines should balanced when possible), cooling criteria (which specify temperatures in physical machines that should not be exceeded), power criteria (which specify that power consumption should be reduced where possible), and other criteria.

The placement controller 154 is able to determine whether the current state of the overall system (which includes the multiple physical machines) conforms to the policy. If the placement controller 154 determines that the state of the system does not conform to the policy, then the placement controller 154 can perform a re-evaluation to determine a different placement of virtual machines on physical machines to increase conformance to the policy.

If a different placement is determined by the placement controller 154 to be desirable, the placement controller 154 is able to perform migration of virtual machines from one physical machine to another physical machine. After placement of the virtual machines has been changed (by migration), the placement controller 154 can subsequently determine whether further migration should be performed. Note that workloads at the physical machines are continually changing (such as due to virtual machines being created and/or destroyed). The placement controller 154 repeatedly checks (in a loop) whether the state of the system conforms to policy. In effect, the placement controller 154 provides a feedback-driven mechanism to control the mapping of virtual machines onto physical machines. This feedback-driven mechanism allows automated adjustments of placement of the virtual machines on physical machines. By automating the virtual machine placement control, relatively quick response times can be achieved in changing placements of virtual machines in response to observed or predicted events that affect conformance with policy.

The automated placement (initial and dynamic) of virtual machines on physical machines provided by the controller 154 according to some embodiments allows the system to meet customer quality-of-service (QoS) goals and the system's cost-of-service (CoS) goals on a given resource (made up of the physical machines in the system).

As depicted in FIG. 1, each placement controller 154 includes one or more CPUs 160 and memory 162. Also, a network interface 164 is provided in the placement controller 154 to allow communication between the placement controller 154 and the network 104.

The placement controller 154 also includes a VM layout selector 156 (to perform selection of a layout of the virtual machines mapped to physical machines), in accordance with some embodiments. Additionally, the placement controller 154 includes a migration control module 158 to control migration of virtual machines from one physical machine to another physical machine (in accordance with the layout selected by the VM layout selector 156). In some implementations, the VM layout selector 156 and migration control module 158 are software modules executable on the CPU 160 of the placement controller 154.

Figure 2A:
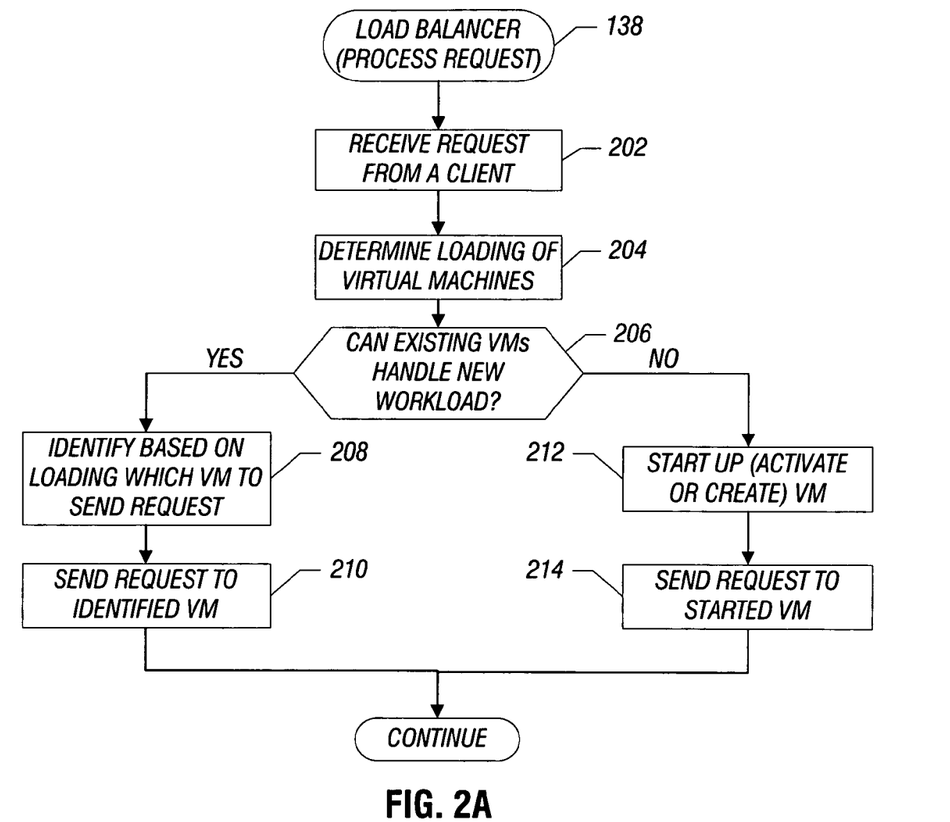
FIGS. 2A-2B are flow diagrams of a process performed by the load balancer according to an embodiment.

FIG. 2A shows a process performed by the load balancer 138 according to an embodiment. The load balancer 138 receives (at 202) a request from a client. In response to the request, the load balancer 138 determines (at 204) loading of virtual machines. This can be determined based on the virtual machine load information 152 stored in the request server 106. From the virtual machine load information 152, the load balancer 138 determines (at 206) whether the existing virtual machines can handle the new workload. The determination of whether a virtual machine can handle new workload is based on a comparison of the existing load condition of the virtual machine with some predefined threshold. The load condition can refer to loading of any particular resource (CPU, memory, I/O device) of a physical machine, or the percentage of the overall physical machine consumed by the particular virtual machine.

If the load balancer 138 determines that the existing virtual machines can handle the new workload represented by the received request, then the load balancer 138 identifies (at 208) which virtual machine to send a request to, based on the virtual machine load information. The load balancer 138 is configured to balance the load across the virtual machines to achieve balanced workloads by the multiple virtual machines. Identifying virtual machines to send new workload to can be based on a round-robin algorithm, can be based on mapping types of requests to corresponding virtual machines, or other algorithms. The load balancer 138 then sends (at 210) the request to the identified virtual machine.

If the load balancer 138 determines (at 206) that the existing virtual machines are unable to handle the new workload, then the load balancer 138 starts up (at 212) a virtual machine, where starting up a virtual machine can mean activating an inactive virtual machine or creating a new virtual machine. The request is then sent (at 214) to the started virtual machine. In one embodiment, a threshold can be set to represent the maximum average workload for the virtual machines. For example, such a threshold can be a certain number of requests per time interval (e.g., 50 requests per second). If the average workload per virtual machine (total workload divided by the number of virtual machines) exceeds the threshold, then the load balancer 138 can start up virtual machines to reduce the average workload per virtual machine.

Figure 2B:
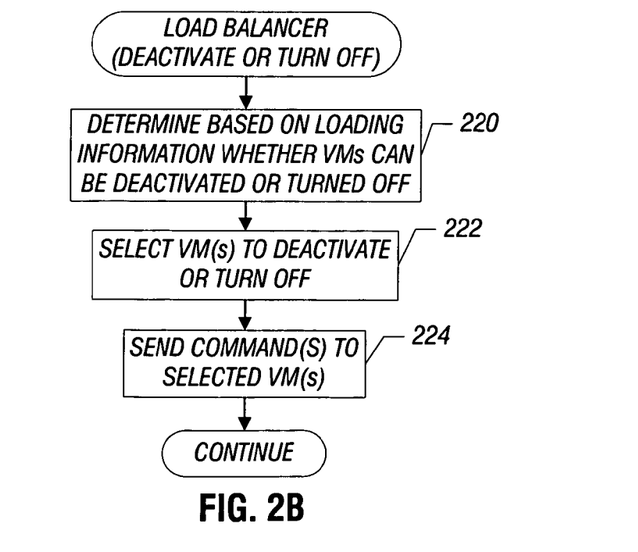

As depicted in FIG. 2B, periodically, or in response to updates of the loading information 152, the load balancer 138 determines (at 220) based on the loading information 152 whether one or more virtual machines can be deactivated (placed into a suspended state) or turned off (destroyed or removed). This decision can be based on the average workload per virtual machine falling a certain amount below the workload threshold discussed above. The load balancer 138 then selects (at 222) the virtual machine(s) to disable (deactivate or turn off). Effectively, a hysteresis band can be defined where a virtual machine is disabled if the average workload falls below the bottom of the band, but a virtual machine is enabled if the average workload rises above the top of the band. The virtual machine(s) selected can be one(s) that are idle (no longer needed). Due to reduced workload, the load balancer 138 can redistribute workload across the virtual machines such that one or more of the virtual machines become idle, which idle virtual machine(s) can then be selected to deactivate or turned off.

The load balancer 138 then sends (at 224) command(s) to the selected virtual machine(s) to deactivate or turn off the selected virtual machine(s). Note that disabling of virtual machines can be controlled by the placement controller 154 in other embodiments.

Even though the load balancer 138 attempts to distribute loading across virtual machines, it is noted that conditions in physical machines can change that may benefit from virtual machines migrating between or among physical machines. The placement of the virtual machines can be controlled by the placement controller 154.

The placement problem for identifying an optimal solution for placement of virtual machines on physical machines is a relatively complex problem. For a large system having many physical machines and virtual machines, the computation time for identifying the optimal placement of virtual machines can be very large. In accordance with an embodiment, a simulated annealing technique is used to find an approximation of a globally optimal placement of virtual machines on physical machines. Generally, simulated annealing considers a current set (that represents some random placement of virtual machines on physical machines), and iteratively adjusts the current set until a better set can be identified. The simulated annealing algorithm attempts to replace a current solution with a random "nearby" solution. A new set that is more optimal than the current set is used as the new current set, and this process repeats until an approximated optimal solution is identified.

The simulated annealing algorithm performed by the VM layout selector 144 is based on a cost function (alternatively referred to as a "goodness function") that takes into account various constraints that represent the predefined criteria described above. The cost function is represented by some aggregation of terms, where each term is multiplied by a weight factor. Generally, the cost function has the form: $f = w_1 \times t_1 + w_2 \times t_2 + \ldots$, where the $t_i$ terms (i=1 to N) represent corresponding criteria (N total criteria, where N is an integer) to be considered, and the $w_i$ parameters represent weights to be applied to the terms. As examples, the $t_i$ terms can represent resource loading criteria (n terms to correspond to the n dimensions of resources), balancing criteria, cooling criteria, power criteria, and so forth. The weight to be multiplied to each term generally represents the importance of the corresponding term in computing the goodness rating for a particular layout of virtual machines.

The weights in some cases can be set (or otherwise influenced) by a user. For example, the controller 154 can present a graphical user interface (GUI) screen that provides various fields in which the user can input values corresponding to weights to be applied to various terms. In an alternative implementation, the weights can be input to the controller 154 by some other technique, such as in a file. Other weights can be hardcoded into the VM layout selector 156.

Each of the terms in the cost function is based on parameters measured or estimated by the VM layout selector 156. For a given layout of virtual machines, parameters corresponding to the various criteria being considered are measured or estimated. For example, parameters relating to resource utilization, cooling costs, power consumption, balancing, and so forth, for a given layout of virtual machines can be measured or estimated. Note that the parameters corresponding to the current layout (the layout that is currently being used) can be measured by the VM layout selector 156. However, when considering alternative layouts (which are trial layouts not yet implemented) to compare to the current layout, the parameters for the alternative layouts may have to be estimated (using an internal model provided with the VM layout selector 156), where the model can be generated based on historical information. The measured or estimated parameters are then translated to the terms of the cost function. Thus, for each given layout of virtual machines, the cost function outputs a goodness rating indicator.

Figure 3:
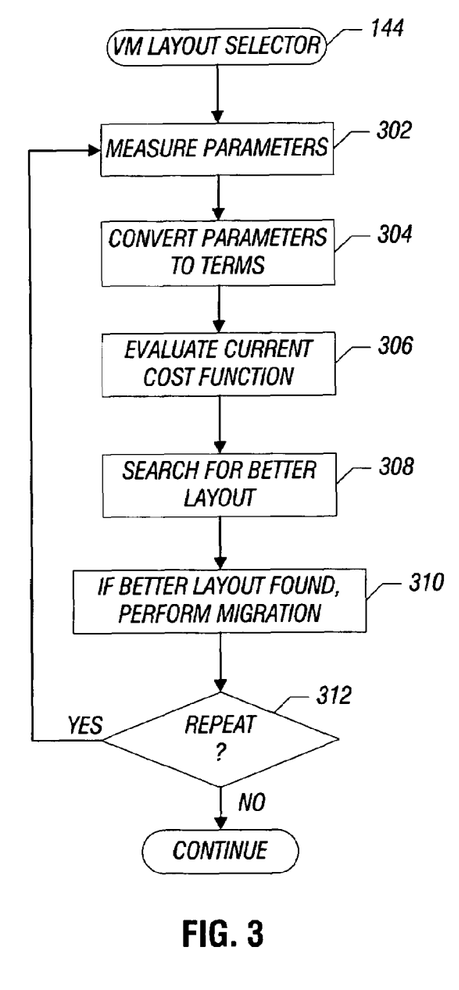
FIG. 3 is a flow diagram of virtual machine layout selection process performed by a placement controller, in accordance with an embodiment.

A flow diagram of a process performed by the VM layout selector 156 is depicted in FIG. 3. The flow of FIG. 3 is performed repeatedly, such as at regular intervals or in response to predefined events. The VM layout selector 156 of the controller 136 measures (at 302) various parameters relating to the terms to be considered for the cost function discussed above. The measured parameters are converted (at 304) into the terms for use in the cost function.

The VM layout selector 156 then evaluates (at 306) the cost function based on the terms derived from the measured parameters. The cost function produces an output that provides some indication of the performance of the particular placement of virtual machines on physical machines (such as in the form of a goodness rating or some other indicator). Next, the VM layout selector 156 searches (at 308) for a better layout that represents another placement of virtual machines on physical machines.

If a better virtual machine layout is found in the search (at 308) for the better layout, the VM layout selector 156 causes the migration module 158 to perform (at 310) migration of one or more virtual machines according to the better virtual machine layout. Migrating a virtual machine refers to moving the state of the virtual machine from one physical machine to another physical machine. The state of the virtual machine includes content of registers of various hardware devices (e.g., CPUs, content of memory, I/O devices, and so forth). Another state of a virtual machine includes the state of a root disk associated with the virtual machine, which root disk can include operating system registries and other information.

The VM layout selector 156 determines (at 312) if the process at 304-310 is to be repeated. Repetition of the process at 304-310 can be performed periodically or in response to predefined events (e.g., detection of overheating, alarm indicating some fault has occurred, and indication of overloading, etc.).

Figure 4:
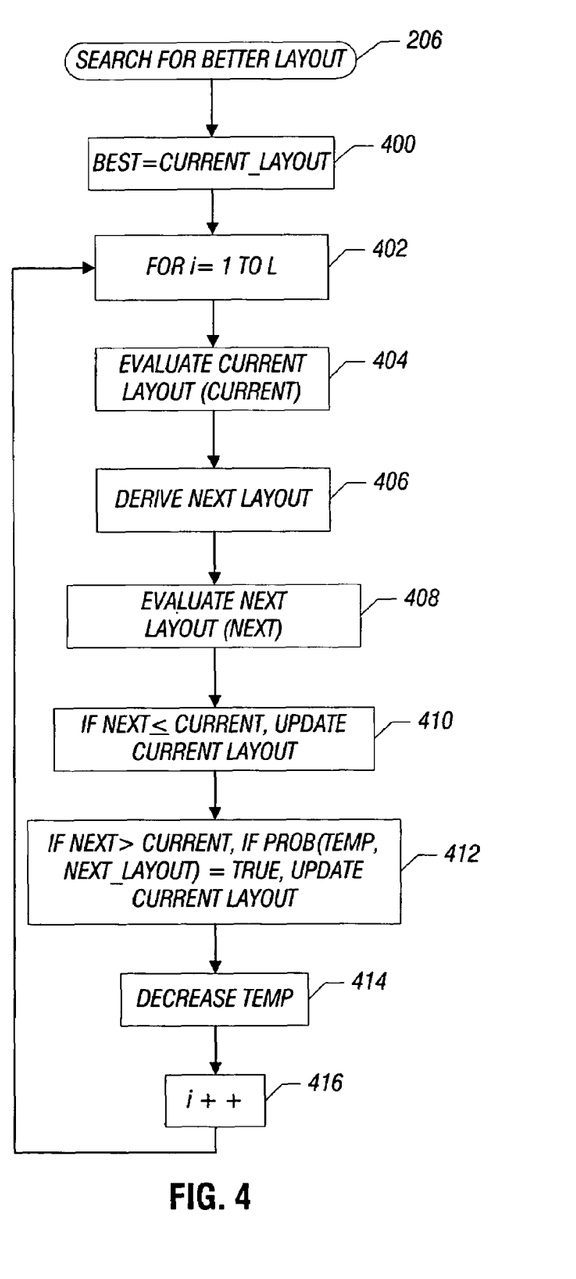
FIG. 4 is a flow diagram of a process to find a better layout of virtual machines, in accordance with an embodiment.

The process of searching for a better layout (308) according to one implementation is depicted in greater detail in FIG. 4. Note that different algorithms can be used in other implementations. Searching for a better layout is performed iteratively in a loop (For loop 402 where a variable i is incremented from 1 to L). Note that the value of L (which represents the number of iterations to be performed in searching for a better layout) is dependent upon various factors, including desired quality of the solution identified in the search and computation time constraints. The value of L may potentially be influenced by a user or by the controller 154. A larger number of iterations (larger L) would lead to a better solution; however, the larger number of iterations comes at the expense of longer computation time. Another factor to be considered in setting the value of L is the expected frequency with which the procedure of FIG. 4 is performed. The computation time involved in performing the process of FIG. 4 should not exceed the expected time interval between iterations of the FIG. 3 procedure; otherwise, the result produced by the FIG. 4 procedure in finding a better layout would not be produced in time for use in the procedure of FIG. 3.

In FIG. 4, before starting the loop 402, a variable Best is set (at 400) equal to the current layout (represented by Current_Layout). Next, after entering the loop 402, the current layout is evaluated (at 404) by setting a variable Current equal to Eval(Current_Layout). Eval( ) is a subroutine invoked by the VM layout selector 156 to evaluate the cost function, in this case the cost function containing terms relating to the current layout.

A next layout (represented by Next_Layout) is then derived (at 406) by setting Next_Layout equal to Tweak(Current_Layout), where Tweak( ) is a subroutine invocable by the VM layout selector 156 for modeling the change in the placement of virtual machines. In other words, the layout produced by Tweak( ) is a trial layout used for purposes of comparison to the current layout; no actual migration of virtual machines occurs yet. According to the simulated annealing technique, the next layout selected is based on generating random numbers, where the random numbers can indicate which virtual machine(s) and which physical machine(s) are to be the subject of a migration, which migration causes the next layout to be different from the current layout. In one embodiment, according to the simulated annealing technique, the tweak can be a minor tweak, in which just one or two virtual machines are moved to different physical machines. In yet another implementation, over L iterations, two moves of virtual machines can be made in iterations 1 to L/2, whereas just one move of a virtual machine is performed in iterations L/2+1 to L. In other implementations, other types of tweaks can be performed.

After the next layout has been derived, the VM layout selector 156 evaluates (at 408) the next layout (the tweaked layout) by calling Eval(Next_Layout). The result of the evaluation (the goodness rating) is stored in a variable Next. Assuming that a lower goodness rating specifies a better layout, if Next≦Current (in other words, the tweaked layout is better than the current layout according to the goodness rating), then the current layout is updated (at 410). In updating the current layout, Current_Layout is set equal to Next_Layout, and the variable Best is set equal to Next_Layout. Note that in other implementations, other types of goodness ratings can be used, where a higher goodness rating would indicate a better layout.

If the tweaked layout is determined to be worse than the current layout based on the goodness rating (Next>Current), then the current layout (Current_Layout) can still be updated (at 412) with the tweaked layout (Next_Layout) based on the output of a probability function, Prob(Temp, Next_Layout). Effectively, if the probability function evaluates to a true result, the current layout is set equal to the tweaked layout even though the tweaked layout has a worse goodness rating (Next) than the goodness rating (Current) of the current layout. This update of the current layout with a worse tweaked layout is performed to reduce the likelihood that the algorithm of searching for a better layout will be trapped in a local minimum.

The probability function Prob( ) compares a random number against a value that is based on goodness ratings Next and Current and a temperature value (Temp). In one embodiment, comparison performed by the Prob( ) function is expressed as follows:

$$Rg( )<e^{(Current-Next)/Temp},\qquad (Eq.\ 1)$$

where Rg( ) is a function to produce a random number between 0 and 1. Since Next is larger than Current when the step at 412 is performed, the exponential function e is of a negative value, since (Current−Next) is negative. Therefore, the exponential function e will produce a value less than 1.

The Temp value in Eq. 1 is a value that decreases as a function (linear or non-linear function) of the number of iterations in FIG. 4. As Temp decreases, the exponential function will likely be of a larger negative number with each iteration, such that the exponential function will likely produce a smaller value. A smaller value produced by the exponential function means that the comparison of Eq. 1 will more likely to produce a false result. Because Temp is in the denominator, in the case where Temp is equal to zero, the function Prob( ) handles this special case by outputting a false result.

As indicated by FIG. 4, if the probability function Prob( ) produces a true result, then the current layout is updated (at 412) by setting Current_Layout=Next_Layout, and by also setting Best equal to Next_Layout. However, if the probability function Prob( ) produces a false result, the current layout remains unchanged.

Next, the value of Temp is decreased (at 416). As noted above, decreasing Temp increases the likelihood that the comparison of Eq. 1 produces a false result. The effect of reducing Temp with each iteration of the procedure in FIG. 4 is that in the later rounds of the FIG. 4 procedure, the lower value of Temp will cause it more unlikely for the current layout to be set equal to a tweaked layout that has a worse goodness rating than the current layout.

The value of the variable i is then incremented (at 418), and the loop 402 is re-iterated until L iterations have been performed.

In a different embodiment, instead of using the simulated annealing algorithm discussed above, a genetic algorithm can be used for selecting a better layout regarding placement of virtual machines on physical machines. In the genetic algorithm approach, candidates corresponding to different virtual machine layouts are provided. These candidates are the potential solutions to the problem of finding the better virtual machine layout. The candidates are represented by genetic representations (in the form of genetic individuals that are made up of a set of genes). Thus, each genetic individual represents a possible virtual machine placement solution. Each of the candidates represented by the genetic individuals is evaluated by the genetic algorithm to determine some goodness rating (which can be computed using a function for producing a measure indicating performance) for the corresponding candidate.

Some subset of the genetic individuals can then be selected (such as the subset of parents with the best goodness ratings) as parents for performing cross-over operation. In a cross-over operation, one genetic individual is combined with another genetic individual (by a cross-over function) to produce a child genetic individual. Each child genetic individual represents a different potential solution of a virtual machine layout. The goodness ratings for the children genetic individuals are then determined, with these children genetic individuals selected for further cross-over operation. The genetic algorithm proceeds over several different generations until some better solution is identified. The number of generations to be traversed can be preset. A benefit of genetic algorithms is that they are less likely to be trapped in local minima.

In yet another embodiment, other types of Stochastic algorithms can be used to approximate an optimal solution to the virtual machine placement problem by using a random search of some portion of the solution space. The simulated annealing technique and genetic algorithm technique discussed above are examples of Stochastic algorithms.

Instructions of software described above (including load balancer 138, network monitor 140, create VM function 142, activate VM function 144, VM layout selector 156, and migration control module 158 of FIG. 1) are loaded for execution on a processor (such as one or more CPUs 146, 160 in FIG. 1). The processor includes microprocessors, microcontrollers, processor modules or subsystems (including one or more microprocessors or microcontrollers), or other control or computing devices.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a system having plural physical machines that each contains one or more active virtual machines, comprising:
receiving, at a load balancer, a request from a client;
in response to the request, determining whether at least one additional virtual machine should be started up;
in response to determining that at least one additional virtual machine should be started up, the load balancer sending at least one command to start up the at least one additional virtual machine in at least one of the physical machines;
a placement controller modifying placement of the active virtual machines on the physical machines in response to starting up of the at least one additional virtual machine;
computing by the placement controller indicators associated with corresponding plural different layouts of the active virtual machines and the at least one additional virtual machine on the physical machines;
selecting, by the placement controller, one of the plural layouts based on the indicators;
placement controller one of the plural layouts based on the indicators;
determining, by the load balancer, whether a workload loading of the active virtual machines and the at least one additional virtual machine has fallen below a threshold; and
in response to determining that the workload loading has fallen below the threshold, disabling a particular one of the active virtual machines and the at least one additional virtual machine.

2. The method of claim 1, wherein sending the at least one command to start up the at least one additional virtual machine comprises sending the at least one command to activate the at least one additional virtual machine that is in a suspend state.

3. The method of claim 1, wherein sending the at least one command to start up the at least one additional virtual machine comprises sending the at least one command to create the at least one additional virtual machine.

4. The method of claim 1, further comprising:
the load balancer balancing workload of the active virtual machines and the at least one additional virtual machine in the physical machines, wherein the workload is responsive to requests received over a network from one or more clients.

5. The method of claim 1, further comprising:
the placement controller modifying placement of the active virtual machines and the at least one additional virtual machine on the physical machines in response to a changing condition.

6. The method of claim 1, wherein disabling the particular virtual machine comprises one of turning off the particular virtual machine and placing the particular virtual machine into a low power mode.

7. The method of claim 6, wherein disabling the particular virtual machine is performed in response to a command from the load balancer.

8. The method of claim 6, wherein disabling the particular virtual machine is performed under control of the placement controller that manages placement of virtual machines on physical machines.

9. The method of claim 6, wherein determining that the at least one additional virtual machine should be started up is in response to load conditions of the active virtual machines on the plural physical machines.

10. The method of claim 9, further comprising:
receiving, by the load balancer, a second request;
determining whether the active virtual machines are able to handle the second request; and
in response to determining that the active virtual machines are able to handle the second request, sending the second request to an identified one of the active virtual machines.

11. The method of claim 1, further comprising:
redistributing the workload of the active virtual machines and the at least one additional virtual machine such that at least one of the active virtual machines and the at least one additional virtual machine is idle; and
selecting the idle virtual machine as the particular virtual machine to disable.

12. An article comprising a computer-readable storage medium storing instructions that when executed cause a system having a processor to:
receive a request for a service to be performed by an arrangement of physical machines containing active virtual machines;
determine whether the active virtual machines in the physical machines are able to handle the request;
in response to determining that the active virtual machines are unable to handle the request, start up at least one additional virtual machine to handle the request;
determine whether a workload loading of the active virtual machines and the at least one additional virtual machine has fallen below a threshold;
in response to determining that the workload loading has fallen below the threshold, disable a particular one of the active virtual machines and the at least one additional virtual machine;
migrate virtual machines between or among physical machines to achieve a predefined policy;
compute indicators associated with corresponding plural different layouts of the active virtual machines and the at least one additional virtual machine on the physical machines, wherein the indicators provide information regarding performances of corresponding layouts, and wherein each of the indicators is computed based on parameters associated with a corresponding one of the plural layouts;
compare the indicators; and
select one of the plural layouts based on the comparing.

13. The article of claim 12, wherein starting up the at least one virtual machine comprises one of (1) activating the at least one additional virtual machine from a suspend state, and (2) creating the at least one additional virtual machine.

14. The article of claim 12, wherein determining that the active virtual machines are unable to handle the request comprises detecting that an average workload per active virtual machine has exceeded a predefined threshold.

15. The article of claim 12, wherein the instructions when executed cause the system to further:
redistribute the workload of the active virtual machines and the at least one additional virtual machine such that at least one of the active virtual machines and the at least one additional virtual machine is idle; and
select the idle virtual machine as the particular virtual machine to disable.

16. A method for use in a system having plural physical machines that contain active virtual machines, comprising:
receiving, at a load balancer, a request from a client;
in response to the request, determining whether at least one additional virtual machine should be started up;
in response to determining that at least one additional virtual machine should be started up, the load balancer sending at least one command to start up the at least one additional virtual machine in at least one of the physical machines;
determining, by the load balancer, whether a workload loading of the active virtual machines and the at least one additional virtual machine has fallen below a threshold;
in response to determining that the workload loading has fallen below the threshold, disabling a particular one of the active virtual machines and the at least one additional virtual machine;
a placement controller selecting placement of the active virtual machines and the at least one additional virtual machines on the physical machines to achieve a predefined policy;
computing, by the placement controller, indicators associated with corresponding plural different layouts of the active virtual machines and the at least one additional virtual machine on the physical machines, where the indicators provide information regarding performances of the corresponding layouts, and wherein each of the indicators is computed based on parameters associated with a corresponding one of the plural layouts;
comparing, by the placement controller, the indicators; and
selecting, by the placement controller, one of the plural layouts based on the comparing.

17. A system comprising:
physical machines that each contains one or more virtual machines;
a request server comprising:
a processor; and
a load balancer executable on the processor to:
receive requests from one or more clients;
distribute requests across active virtual machines in the physical machines;

start up additional virtual machines in response to a workload of the active virtual machines exceeding a first threshold;

determine whether a workload loading of the active virtual machines and the additional virtual machines has fallen below a second threshold; and in response to determining that the workload loading has fallen below the second threshold, disable a particular one of the active virtual machines and the additional virtual machines; and a placement controller to:

modify placement of the active virtual machines on the physical machines in response to starting up of the additional virtual machines;

compute indicators associated with corresponding plural different layouts of the active virtual machines and the additional virtual machines on the physical machines; and select one of the plural layouts based on the indicators.

18. The system of claim 17, wherein the request server further comprises a network monitor executable on the processor to receive workload information from the active virtual machines for use by the load balancer.

* * * * *

UNITED STATES PATENT AND TRADEMARK OFFICE
CERTIFICATE OF CORRECTION

PATENT NO. : 8,185,893 B2
APPLICATION NO. : 11/588635
DATED : May 22, 2012
INVENTOR(S) : Chris D. Hyser et al.

Page 1 of 1

It is certified that error appears in the above-identified patent and that said Letters Patent is hereby corrected as shown below:

In the Claims:

In column 10, line 47, in Claim 1, delete "computing" and insert -- computing, -- therefor.

In column 10, line 47, in Claim 1, delete "controller" and insert -- controller, -- therefor.

In column 10, lines 53-54, in Claim 1, after "indicators;" delete "placement controller one of the plural layouts based on the indicators;".

Signed and Sealed this
Eighteenth Day of June, 2013

Teresa Stanek Rea
*Acting Director of the United States Patent and Trademark Office*